United States Patent
Bao et al.

(10) Patent No.: US 9,491,121 B2
(45) Date of Patent: Nov. 8, 2016

(54) CONTROLLABLE VIRTUAL LINK AGGREGATION INTERNET PROTOCOL FORWARDING

(71) Applicant: LENOVO Enterprise Solutions (Singapore) PTE, LTD., New Tech Park (SG)

(72) Inventors: Lei Bao, Wuxi (CN); Chidambaram Bhagavathiperumal, Santa Clara, CA (US); Yuhong Guo, Wuxi (CN); Yi Xia, Wuxi (CN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 72 days.

(21) Appl. No.: 14/340,452

(22) Filed: Jul. 24, 2014

(65) Prior Publication Data

US 2016/0028653 A1    Jan. 28, 2016

(51) Int. Cl.
| | | |
|---|---|---|
| *H04L 12/947* | (2013.01) | |
| *H04L 12/46* | (2006.01) | |
| *H04L 12/709* | (2013.01) | |
| *H04L 12/751* | (2013.01) | |

(52) U.S. Cl.
CPC .......... *H04L 49/25* (2013.01); *H04L 12/4633* (2013.01); *H04L 12/4641* (2013.01); *H04L 12/4683* (2013.01); *H04L 45/02* (2013.01); *H04L 45/245* (2013.01)

(58) Field of Classification Search
None
See application file for complete search history.

(56) References Cited

U.S. PATENT DOCUMENTS

| | | | |
|---|---|---|---|
| 2004/0215821 A1 | 10/2004 | Regan et al. | |
| 2005/0066216 A1* | 3/2005 | Hebbar | H04L 45/00 714/1 |
| 2008/0049763 A1* | 2/2008 | Damm | H04L 12/4625 370/400 |
| 2008/0151882 A1* | 6/2008 | Sanjay | H04L 45/586 370/389 |
| 2009/0268607 A1 | 10/2009 | Wang et al. | |
| 2014/0211607 A1* | 7/2014 | Li | H04L 49/552 370/219 |
| 2014/0211792 A1 | 7/2014 | Li et al. | |

FOREIGN PATENT DOCUMENTS

| | | |
|---|---|---|
| EP | 2 108 224 B1 | 1/2008 |
| EP | 1 482 693 B1 | 7/2008 |

OTHER PUBLICATIONS

Hinden, R., "Virtual Router Redundancy Protocol (VRRP)", Apr. 1, 2004, p. 1-29, IP.com, United States.

(Continued)

*Primary Examiner* — Derrick Ferris
*Assistant Examiner* — Jay Vogel
(74) *Attorney, Agent, or Firm* — Kunzler Law Group; Katherine S. Brown (57) ABSTRACT

Embodiments of the invention relate to controllable virtual link aggregation Internet Protocol (IP) forwarding. One embodiment includes forming a first virtual link aggregation (vLAG) between a first pair of switches for a first system that implements virtual router redundancy protocol (VRRP). A second vLAG is formed between a second pair of switches for a second system that implements VRRP. A VRRP role is forwarded by each switch of the first pair of switches and the second pair of switches to one another. The VRRP role is synchronized between each of the first pair of switches and the second pair of switches. VRRP packets are forwarded to particular switch ports of the first pair of switches and the second pair of switches.

11 Claims, 9 Drawing Sheets

(56) References Cited

OTHER PUBLICATIONS

Nadas, S., "Virtual Router Redundancy Protocol (VRRP) Version 3 for IPv4 and IPv6", Mar. 1, 2010, p. 1-81, IP.com, United States.
IBM Corporation, "IBM N/OS 7.2 Application Guide—Rack Switch G8052", Feb. 2012, 459 p., United States.
Tate, J., et al., "IBM Flex System and PureFlex System Network Implementation with Cisco Systems", Aug. 2013, 348 p., ibm.com/redbooks, United States.
IBM Corporation, "BLADEOS 6.6 Application Guide—Rack Switch G8264", Apr. 2011, 418 p., United States.
Hinden, R., "Virtual Router Redundancy Protocol (VRRP)", Apr. 1, 2004, p. 1-23, IP.com, United States.

* cited by examiner

FIG. 9

CONTROLLABLE VIRTUAL LINK AGGREGATION INTERNET PROTOCOL FORWARDING

BACKGROUND

The present invention relates to network switches and switching, and more particularly, this invention relates to controllable virtual link aggregation Internet Protocol forwarding between systems.

In a data center comprising one or more access switches, each access switch connects two aggregation switches for redundancy. Link aggregation uses available bandwidth across a switch boundary at an aggregation layer.

In a data center system, virtual link aggregation (vLAG) devices are usually deployed as the gateway network for the access servers because the vLAG devices provide high efficient redundancy and do not waste network resources. Virtual router redundancy protocol (VRRP) is often enabled on all vLAG devices to support layer 3 (L3) traffic routing. In conventional VRRP, only the master device has the ability to route the traffic; all other backup device(s) can not. If the conventional VRRP is enabled on vLAG devices, then the L3 traffic hashed by access to the backup device side has to go through the inter-switch link (ISL) to the master device to perform the routing; it can not be routed locally even if it has uplinks to the outer network (e.g., Intranet, Internet, etc.). Because the L3 traffic has to go through the ISL to the master device, the vLAG redundancy capability is reduced and the ISL load is increased, which can affect vLAG functionalities.

BRIEF SUMMARY

Embodiments of the invention relate to virtual link aggregation. One embodiment includes controllable virtual link aggregation (vLAG) Internet Protocol (IP) forwarding comprising: forming a first vLAG between a first pair of switches for a first system that implements virtual router redundancy protocol (VRRP). In one embodiment, a second vLAG is formed between a second pair of switches for a second system that implements VRRP. A VRRP role is forwarded by each switch of the first pair of switches and the second pair of switches to one another. In one embodiment, the VRRP role is synchronized between each of the first pair of switches and the second pair of switches. VRRP packets are forwarded to particular switch ports of the first pair of switches and the second pair of switches.

Another embodiment comprises a virtual aggregation link system. In one embodiment, the system includes a first pair of switches for a first data center system that implements VRRP. A first vLAG is formed between the first pair of switches. The system further includes a second pair of switches for a second data center system that implements VRRP. A second vLAG is formed between the second pair of switches. In one embodiment, each switch of the first pair of switches and the second pair of switches includes a controllable IP forwarding module. The controllable IP forwarding module: forwards a VRRP role for each switch of the first pair of switches and the second pair of switches to one another, synchronizes the VRRP role between each of the first pair of switches and the second pair of switches, and forwards VRRP packets to particular switch ports of the first pair of switches and the second pair of switches, One embodiment comprises a computer program product for virtual link aggregation. The computer program product the computer program product comprising a computer readable storage medium having program instructions embodied therewith. The program instructions executable by a processor to perform a method comprising: forming, by a first pair of switches, a first vLAG for a first system that implements VRRP. A second pair of switches forms a second vLAG for a second system that implements VRRP. Each switch of the first pair of switches and the second pair of switches forwards a VRRP role to one another. The first pair of switches and the second pair of switches synchronizes the VRRP role. A receiving switch of the first pair of switches and the second pair of switches forwards VRRP packets to particular switch ports of the first pair of switches and the second pair of switches.

Other aspects and embodiments of the present invention will become apparent from the following detailed description, which, when taken in conjunction with the drawings, illustrate by way of example the principles of the invention.

DETAILED DESCRIPTION

Figure 1:
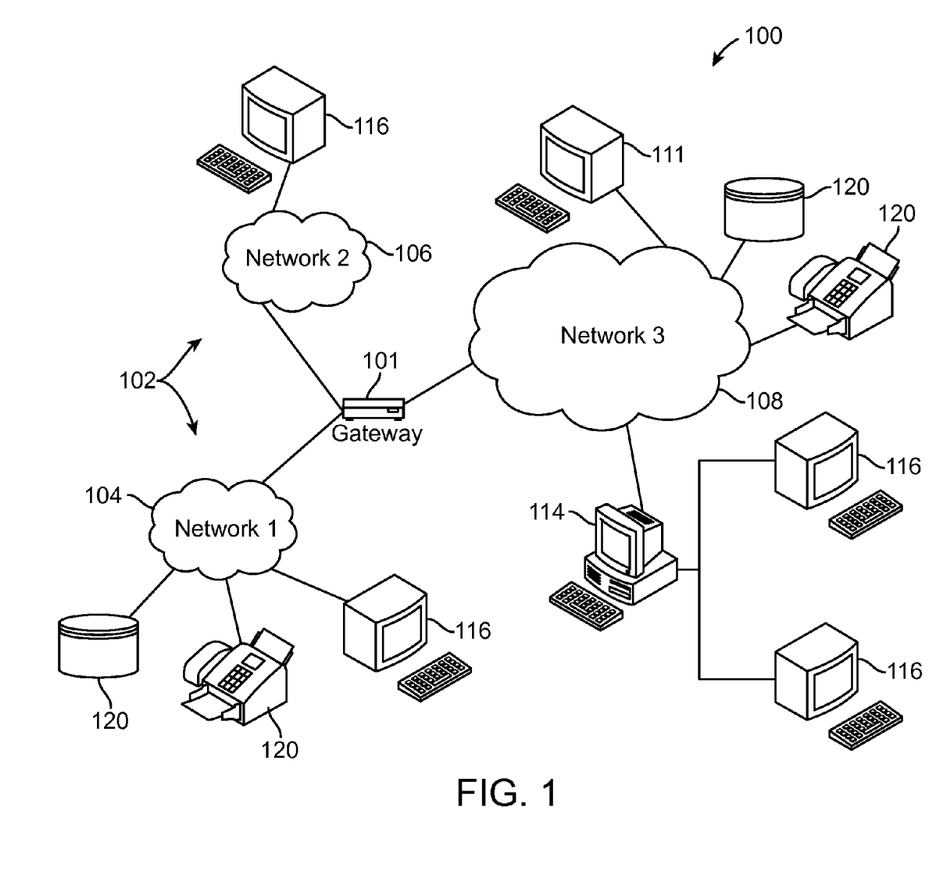
FIG. 1 is a network architecture, in accordance with one embodiment of the invention.

Referring now to the drawings, FIG. 1 illustrates a network architecture 100, in accordance with one embodiment. As shown in FIG. 1, a plurality of remote networks 102 are provided, including a first remote network 104 and a second remote network 106. A gateway 101 may be coupled between the remote networks 102 and a proximate network 108. In the context of the present network architecture 100, the networks 104, 106 may each take any form including, but not limited to, a LAN, a WAN, such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be enhanced through the use of VMWARE software in some embodiments.

In other examples, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, therefore allowing access and distribution of services across many computing systems. Cloud computing typically involves an Internet connection between the systems operating in the cloud, but other techniques of connecting the systems may also be used, as known in the art.

Figure 2:
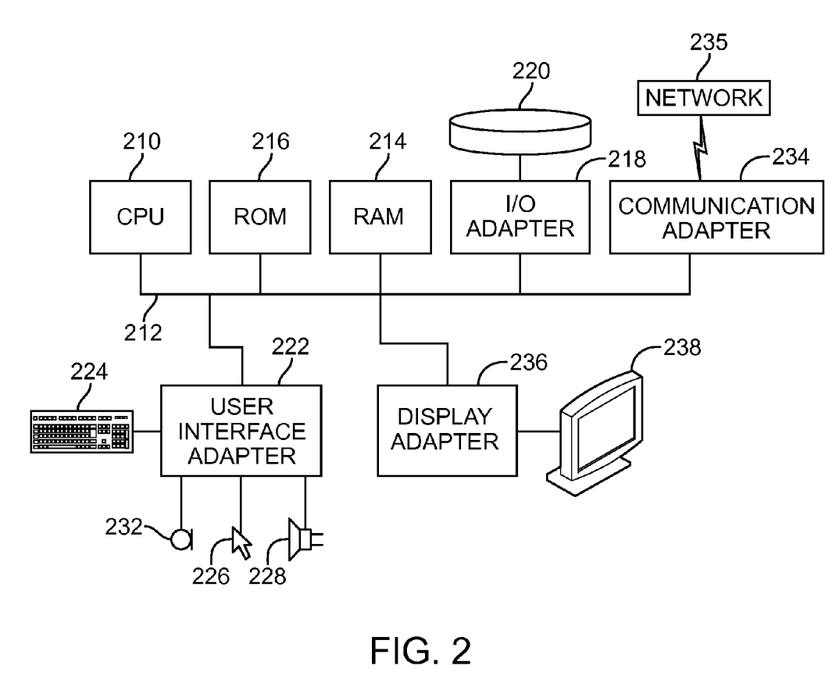
FIG. 2 shows a representative hardware environment that may be associated with the servers and/or clients of FIG. 1, in accordance with one embodiment of the invention.

FIG. 2 shows a representative hardware environment associated with a user device 116 and/or server 114 of FIG. 1, in accordance with one embodiment. In one example, a hardware configuration includes a workstation having a central processing unit 210, such as a microprocessor, and a number of other units interconnected via a system bus 212. The workstation shown in FIG. 2 may include a Random Access Memory (RAM) 214, Read Only Memory (ROM) 216, an I/O adapter 218 for connecting peripheral devices, such as disk storage units 220 to the bus 212, a user interface adapter 222 for connecting a keyboard 224, a mouse 226, a speaker 228, a microphone 232, and/or other user interface devices, such as a touch screen, a digital camera (not shown), etc., to the bus 212, communication adapter 234 for connecting the workstation to a communication network 235 (e.g., a data processing network, a data center, etc.) and a display adapter 236 for connecting the bus 212 to a display device 238.

In one example, the workstation may have resident thereon an operating system, such as the MICROSOFT WINDOWS Operating System (OS), a MAC OS, a UNIX OS, etc. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 3:
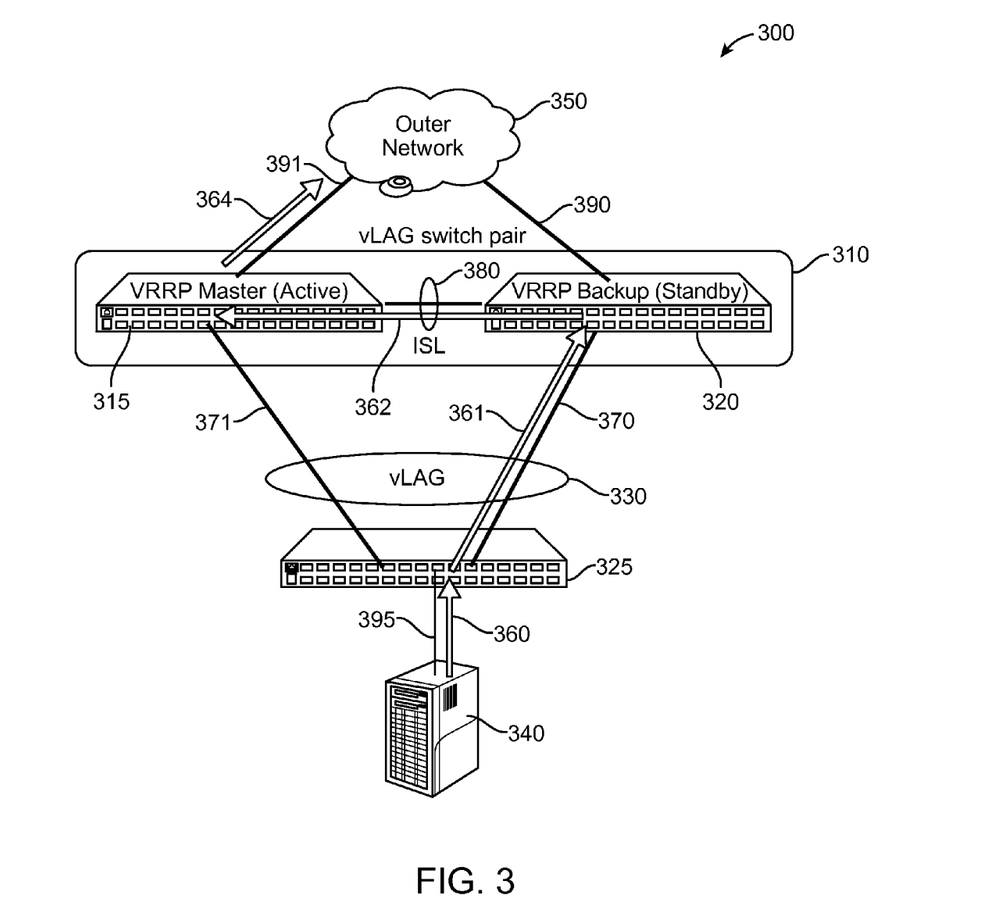
FIG. 3 is a diagram of an example data center system, in which an embodiment of the invention may be implemented.

FIG. 3 is a diagram of an example data center system 300, in which an embodiment of the invention may be implemented. An access switch 325 is connected to two aggregation switches for redundancy, for example, a VRRP switch 315 and a VRRP switch 320. The VRRP switches 315 and 320 and the access switch 325 include many network ports. In one example embodiment, the VRRP switch 315 is selected as the master, and the VRRP switch 320 is the backup. The VRRP switches 320 and 315 form a vLAG switch pair 310 and may communicate over the ISL 380 ports to one another.

Virtual link aggregation group (vLAG) is a feature that uses all available bandwidth without sacrificing redundancy and connectivity. Link aggregation is extended by vLAG across the switch boundary at the aggregation layer. Therefore, an access switch 325 has all uplinks in a LAG, while the aggregation switches 315, 320 cooperate with each other to maintain the vLAG 330. The vLAG 330 comprises virtual links to the VRRP switch 315 and the VRRP switch 320 that may comprise, for example, combinations of physical links 370 and 371 to establish virtual links.

Since vLAG is an extension to standard link aggregation, layer 2 and layer 3 features may be supported on top of vLAG. When the host 340 (e.g., an Internet Protocol (IP) multicast receiver) connected to the access switch 315 (e.g., via physical link 395) sends network traffic (e.g., via a packet), the packet is forwarded to one of the VRRP switches (either VRRP switch 315 or VRRP switch 320). As shown, in the conventional vLAG system with the VRRP switches 315 and 320, the traffic 360 from the host 340 layer 3 (L3) traffic can not be routed locally even if a receiving switch (e.g., VRRP switch 320) has an uplink 390 to the outer network 350. Instead, the traffic 362 from the VRRP switch 320 has to go through the ISL 380 to the peer (e.g., VRRP switch 315), and the traffic 364 from the VRRP switch 315 is then be routed to the outer network 350 over the uplink 391.

Figure 4:
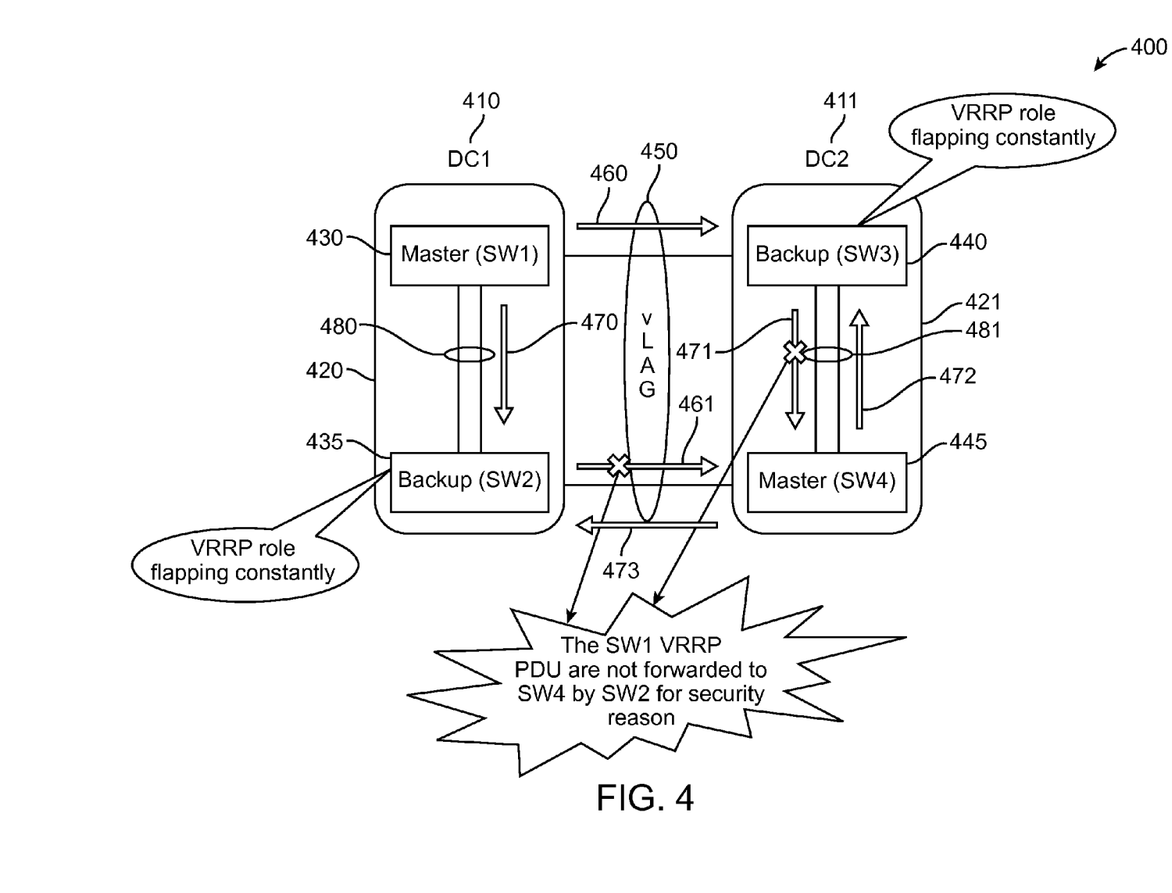
FIG. 4 is a diagram of example conventional interconnected data centers.

FIG. 4 is a diagram of example 400 conventional interconnected data centers DC1 410 and DC2 411. DC1 410 includes VRRP switch 430 (SW1) that is designated as the master and VRRP switch 435 (SW2) that is designated as the backup. SW1 and SW2 form a vLAG 420 and communicate with each other through the ISL 480. DC2 411 includes VRRP switch 440 (SW3) that is designated as the backup and VRRP switch 445 (SW4) that is designated as the master. SW3 and SW4 form a vLAG 421 and communicate with each other through the ISL 481. A vLAG 450 is formed between the DC1 410 and the DC2 411.

In the example 400 with Data Centers Interconnects (DCI) built with a multi-tier vLAG configuration, due to security of forbidding the static media access control (MAC) station move packet receiving will fail. The Active-Active VRRP installs a virtual MAC (VMAC) in the hardware, but this VMAC is the same as the source MAC (SMAC) of the VRRP advertisements packets. When a switch receives a packet for which the SMAC is already in the static forwarding database (FDB), but the incoming ports are different, the switch comprehend this packet coming from a fake station, and then will drop this packet. The Backup Active switch that was installed virtual receiving (VRMAC) will drop the VRRP advertisements packets. In that case the VRRP role on the backup switches will constantly flap.

In the example 400. The packets (e.g., protocol data units (PDUs)) 470 from SW1 to SW2 are not forwarded to SW4 by SW2 for security (i.e., PDU traffic 461 is blocked), and the PDU traffic 460 to SW3, which then is blocked to SW4 (i.e., PDU traffic 471 is blocked). PDU traffic 472 from SW4 to SW3 and PDU traffic 473 from SW4 to SW2 assists with the VRRP master-backup role flapping.

Figure 5:
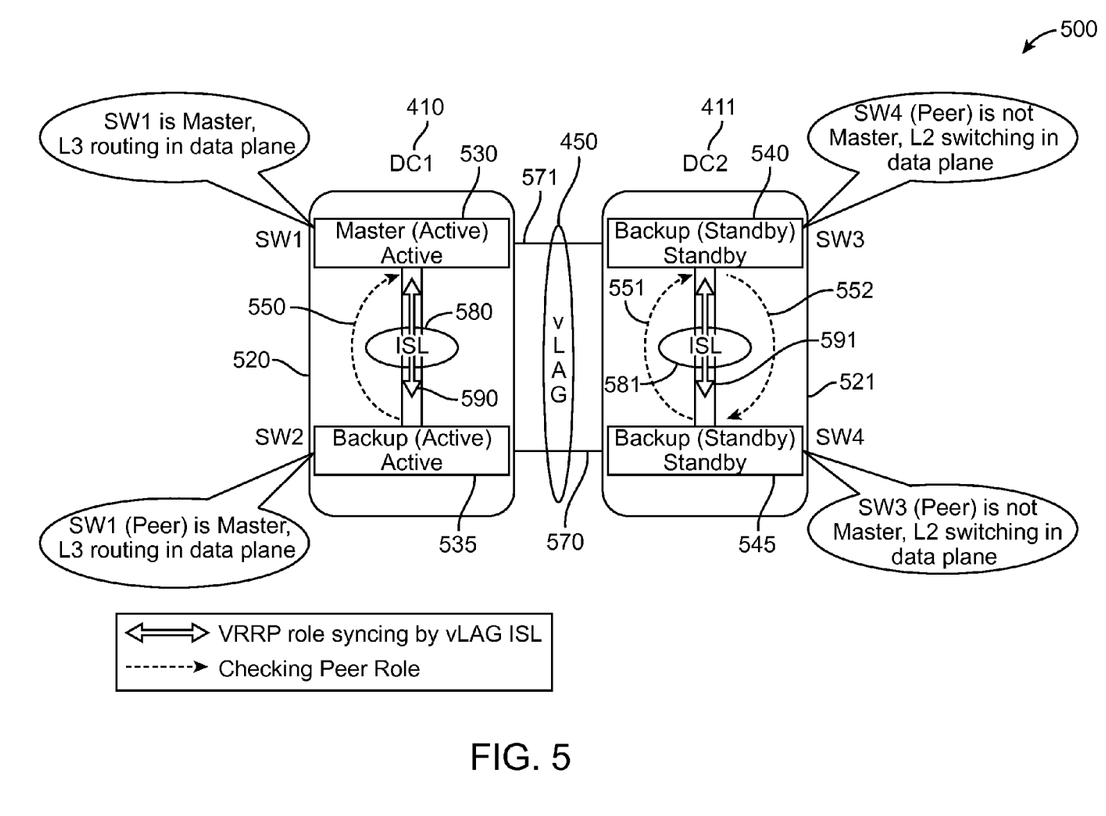
FIG. 5 is a diagram of example interconnected data centers; according to one embodiment of the invention.

FIG. 5 is a diagram of example 500 interconnected data centers DC1 410 and DC2 411 that implement controllable active IP forwarding on multi-tier vLAG+VRRP environments in DCIs, according to one embodiment of the invention. In one embodiment, each VRRP switch (e.g., SW1 530, SW2 535, SW3 540 and SW4 545) in each DC (e.g., DC1 410, DC2 411) includes a controllable IP forwarding module for controlling which vLAG switch pairs are VRRP Active (L3 routable) in the data plane, and may assist customers to optimize their redundant network resources and provide a more stable efficient gateway network for the DCI.

In one embodiment, in order to support a vLAG DCI redundant gateway network, the controllable IP forwarding module provides L3 routing (Active) based on the VRRP role of the peer vLAG switch, and forwarding of VRRP advertisements packets. In one example embodiment, the VRRP backup switch (e.g., SW2 535) in DC1 410 becomes active (i.e., performs L3 routing) in the data plane, only when the vLAG VRRP peer (e.g., SW1 530) role is master. Otherwise, SW2 535 will perform layer 2 (L2) switching.

As shown in example 500, SW1 530 is the VRRP master; all other three switches (e.g., SW2 535, SW3 540 and SW4 545) are VRRP backups. Since SW1 530 is the master, it is Active in the data plane. SW2 535 is the active backup, and checks the peer SW1 530 role, and determines that SW1 530 is the Master. Therefore, SW2 535 is also active in the data plane. SW3 540 determines that the peer SW4 545 is not the master. Therefore, SW3 540 is not active in the data plane. And SW4 545 is the same as SW3 540. As shown in example 500, SW1 530 and SW2 535 form a vLAG pair 520 and communicate PDUs 590 via the ISL 580 for role synching. SW3 540 and SW4 545 form a vLAG pair 521 and communicate PDUs 591 via the ISL 581 for role synching. In one example, the active backup switch (SW2 535) checks 550 the peer role of SW1 530 via a state stored in a local database (e.g., FDB in SW2 535), the standby backup switch (SW3 540) checks 552 the peer role of SW4 545 via a state stored in a local database (e.g., FDB in SW3 540), and the standby backup switch (SW4 545) checks 551 the peer role of SW3 540 via a state stored in a local database (e.g., FDB in SW4 545).

In one embodiment, each vLAG switch encapsulates its VRRP role in a vLAG synchronization (sync) PDU, and sends it to the peer through the vLAG ISL (e.g., ISL 580, 581). When the peer receives the sync PDU, the switch records the peer VRRP role information in the local database (e.g., FDB). In one embodiment, each time the VRRP role changes, the switch synchronizes the new state to the peer switch. The non-active backup switches (e.g., SW3 540, SW4 545) only perform L2 switching in the data plane. Once the current master (e.g., SW1 530) switch is down, it may enter into the active state, which depends on the new VRRP role selection mechanism. In one example, if SW1 530 is down, and SW2 535 has higher priority, then SW2 535 becomes the new master. There will only be SW2 535 as active as SW3 540 and SW4 545 will still be in standby mode. But if SW3 540 or SW4 545 has their role change to master, then SW3 540 and SW4 545 become active and SW2 535 is placed in standby mode.

Figure 6:
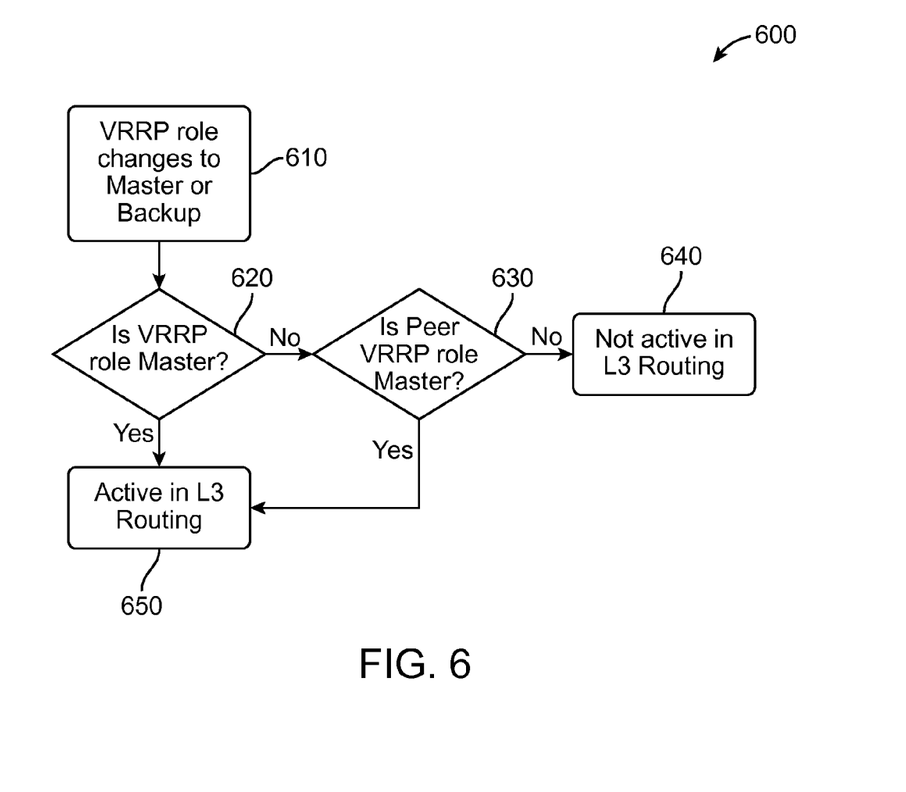
FIG. 6 is a flow diagram for active controlling, according to one embodiment of the invention.

FIG. 6 is a flow diagram 600 for active controlling, according to one embodiment of the invention. In one embodiment, in block 610 a VRRP role changes to master or backup for a peer switch in a vLAG (e.g., vLAG 520, 521, FIG. 5). In block 620 the peer switches determine the VRRP master role. If a VRRP switch determines that it is the master, then in block 650 the switch takes on an active state in L3 routing. Otherwise, in block 630 the switch determines if its peer is currently the VRRP master. If it is determined that the peer is master, the process 600 proceeds to block 650 as the backup switch becomes active in L3 routing. Otherwise, in block 640 the switch is determined to be a backup switch in standby mode (i.e., only performs L2 switching).

Figure 7:
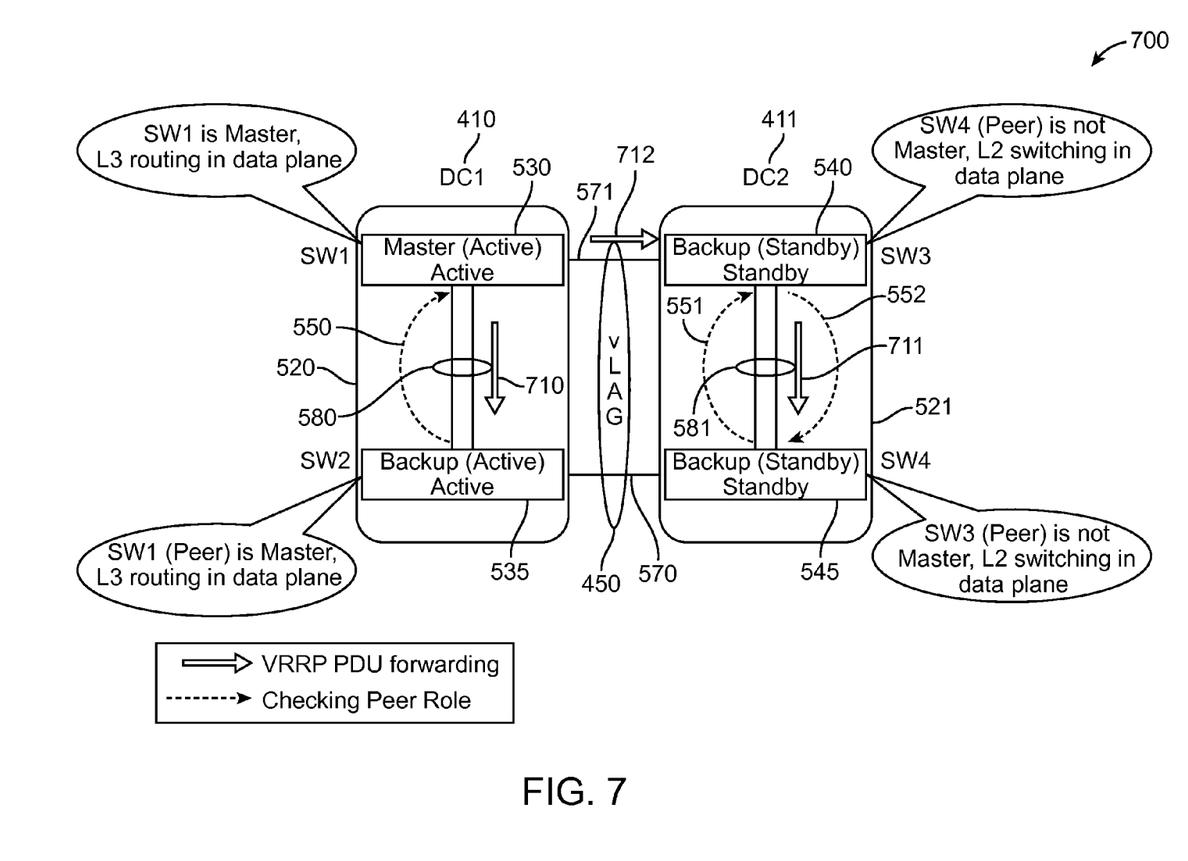
FIG. 7 is a diagram of example interconnected data centers; according to one embodiment of the invention.

FIG. 7 is a diagram of example 700 interconnected data centers DC1 410 and DC2 411, according to one embodiment of the invention. In one embodiment, in order to make the backup switch forward VRRP advertisement packets (e.g., PDUs), software forwarding is needed. But in the vLAG DCI context, there is a physical loop on the DCI links and switches. In one embodiment, in order to prevent the packet looping, the following rules shown in Table 1 are implemented for forwarding packets.

TABLE 1

| VRRP PDU received on | vLAG formed | vLAG not formed |
|---|---|---|
| vLAG ports | Forward to all other ports (vLAG ports, non-vLAG ports, ISL) | Forward to all other ports (vLAG ports, non-vLAG ports, ISL) |
| Non-vLAG ports | Forward to all other ports (vLAG ports, non-vLAG ports, ISL) | Forward to all other ports (vLAG ports, non-vLAG ports, ISL) |
| ISL ports | Forward to all non-vLAG ports | Forward to all other ports (vLAG ports, non-vLAG ports, ISL) |

In example 700, SW1 530 and SW2 535 are in DC1 410, form a vLAG 520 and communicate through the ISL 580. SW3 540 and SW4 545 are in DC2 411, form a vLAG 521 and communicate through the ISL 581. VRRP is enabled on switches SW1 530, SW2 535, SW3 540 and SW4 545. In one embodiment, if SW1 530 is the VRRP master, then SW1 530 sends VRRP advertisement packets (e.g., PDUs) to SW2 535 and SW3 540. Based on the forwarding rules in Table 1, SW3 540 forwards the advertisement packets 711 to SW4 545 (e.g., advertisement packets 710 and 712). All other three switches can receive the advertisement packets from SW1 530, then all four switches are in one VRRP domain, and there is only one master.

Figure 8:
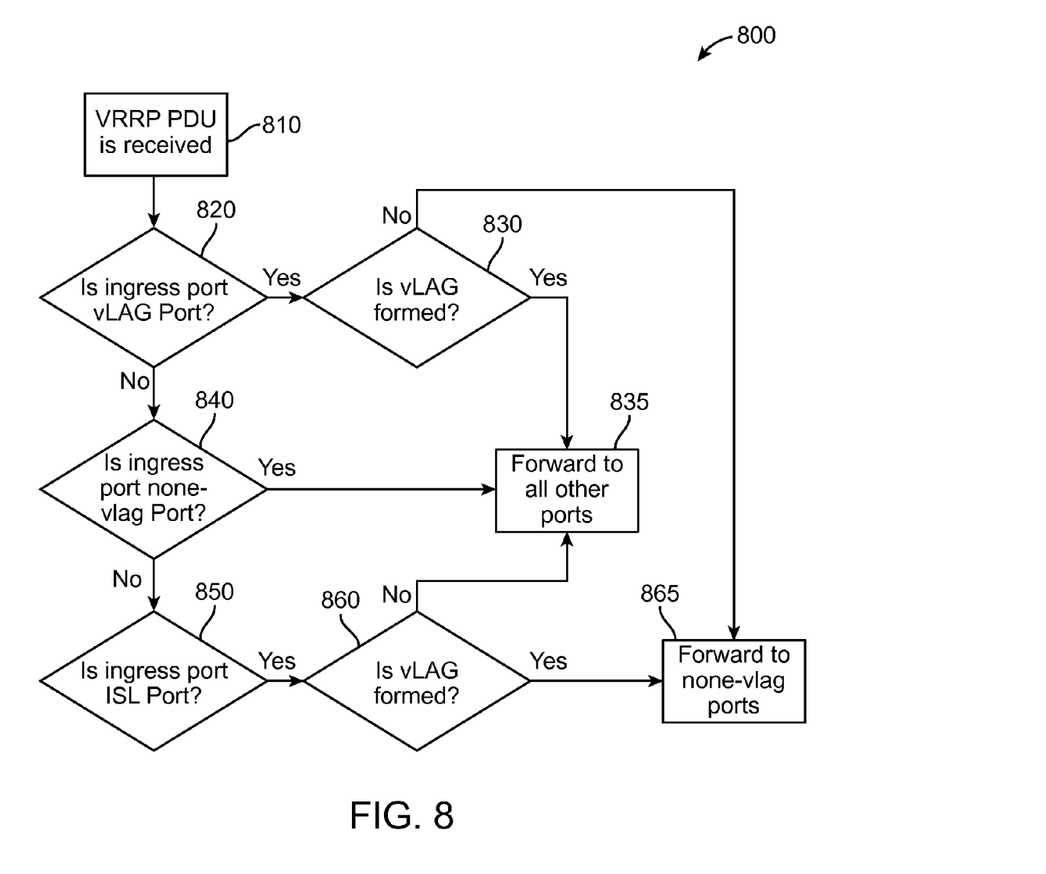
FIG. 8 is a flow diagram for packet forwarding, according to one embodiment of the invention.

FIG. 8 is a flow diagram for process 800 for packet forwarding, according to one embodiment of the invention. In one embodiment, the flow diagram 800 illustrates the forwarding rules shown in Table 1 above. In one embodiment, in block 810 a VRRP PDU is received by a switch of a data center (e.g., DC1 410, DC1 411, FIG. 7). In block 820, it is determined if the ingress port (i.e., the receiving port) is part of a vLAG. If it is determined that the ingress port is a vLAG port, process 800 proceeds to block 830, otherwise process 800 proceeds to block 840. In block 830, it is determined if a vLAG is formed (e.g., between data centers). If it is determined that a vLAG is formed, then process 800 proceeds to block 835 where advertisement packets (e.g., PDUs) are forwarded to all other ports (e.g., vLAG ports, non-VLAG ports and ISL ports). Otherwise, process 800 proceeds to block 865 where the advertisement packets are forwarded to non vLAG ports.

In one embodiment, in block 840 it is determined if the ingress port is a non-vLAG port. If it is determined that the ingress port is a non-vLAG port, process 800 proceeds to block 835. If it is determined in block 840 that the ingress port is not a non-vLAG ort, process 800 proceeds to block 850. In block 850 it is determined if the ingress port is an ISL port. If it is determined that the ingress port is an ISL port, then in block 860 it is determined if a vLAG is formed. In block 860, if a vLAG is determined to be formed, process 800 proceeds to block 865. Otherwise, process 800 proceeds to block 835. In one embodiment, if it is determined that the ingress port is not an ISL port in block 850, the process 800 ceases until another VRRP PDU is received in block 810.

In one or more embodiments, the Active-Active VRRP solution is applied to the single layer vLAG. In the single layer, the controllable Active-Active VRRP is naturally compatible to the conventional Active-Active VRRP implementations. In the single layer vLAG environment, the VRRP is enabled on the two vLAG devices, and one of the devices becomes master, and the other device is the backup: by checking the peer VRRP role, the backup switch will be active because the peer is the master. Therefore, one or more embodiments may be deployed with a single vLAG implementation.

Figure 9:
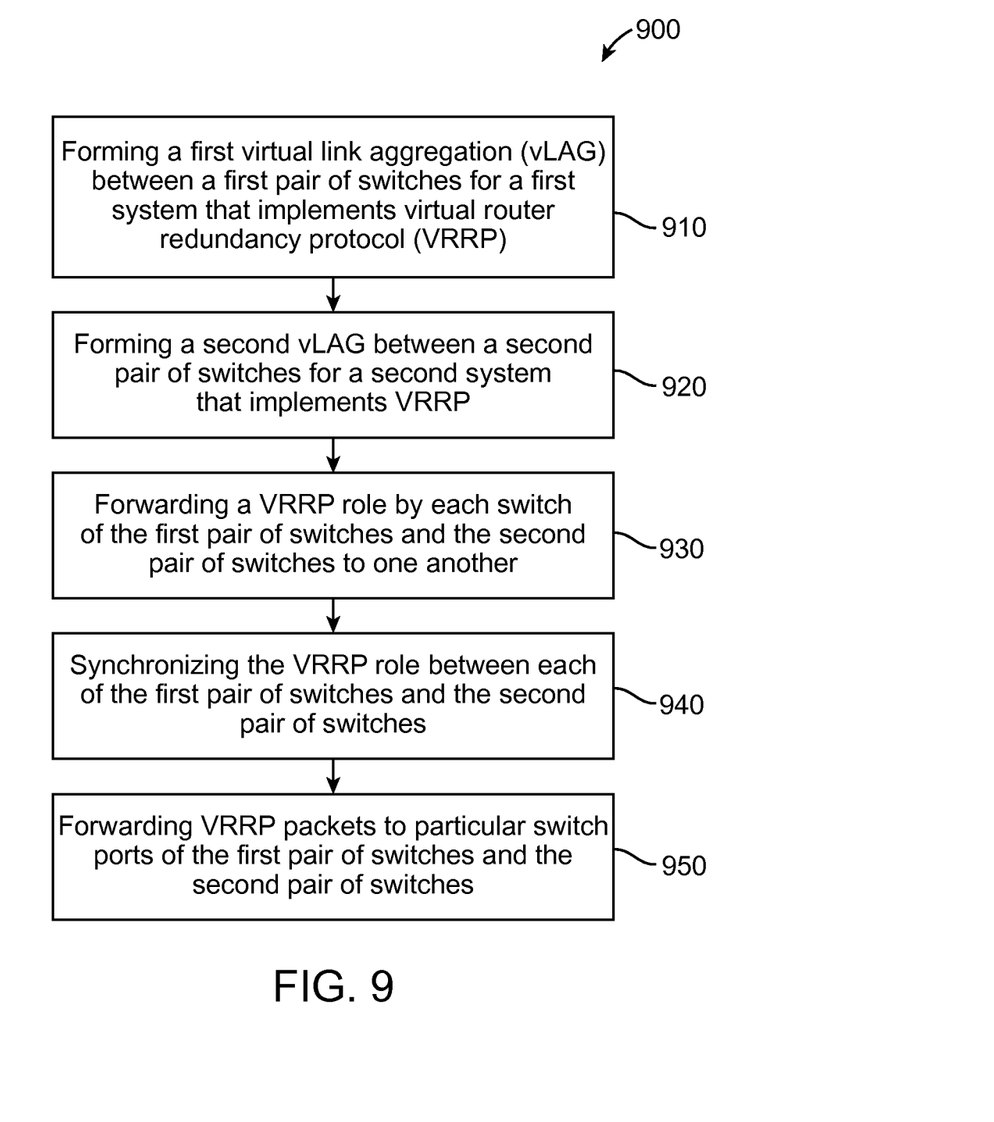
FIG. 9 is a block diagram showing a process for controllable vLAG IP forwarding, in accordance with an embodiment of the invention.

FIG. 9 is a block diagram showing a process 900 for controllable vLAG IP forwarding, in accordance with an embodiment of the invention. In one embodiment, in block 910 a first vLAG is formed between a first pair of switches (e.g., SW1 530, SW2 525, FIGS. 5, 7) for a first system (e.g., DC1 410, FIGS. 5, 7) that implements VRRP. In block 920, a second vLAG is formed between a second pair of switches (e.g., SW3 540, SW4 545, FIGS. 5, 7) for a second system (e.g., DC2 411, FIGS. 5, 7) that implements VRRP. In block 930, a VRRP role is forwarded by each switch of the first pair of switches and the second pair of switches to one another. In block 940, the VRRP role is synchronized between each of the first pair of switches and the second pair of switches. In block 950 VRRP packets (e.g., PDUs) are forwarded to particular switch ports of the first pair of switches and the second pair of switches.

In one embodiment, process 900 may include determining which VRRP role is a master role for a particular switch between the first pair of switches and the second pair of switches, and providing active controlling for the first pair of switches or the second pair of switches based on the determined master role for the particular switch. In one embodiment, forwarding VRRP packets to the particular switch ports of the first pair of switches and the second pair of switches is based on a set of rules (e.g., Table 1), and the first system and the second system each comprise a data center system.

In one embodiment, process 900 may apply the following rules for a formed vLAG that include for received VRRP PDUs on ingress vLAG ports, process 900 forwards received VRRP PDUs to all other: vLAG ports, non-vLAG ports and ISL ports. For received VRRP PDUs on ingress non-vLAG ports, process 900 forwards received VRRP PDUs to all other: vLAG ports, non-vLAG ports and ISL ports. For received VRRP PDUs on ISL ports, process 900 forwards received VRRP PDUs to all non-vLAG ports.

In one embodiment, for non-formed vLAGs, process 900 may apply the following rules: for received VRRP PDUs on ingress vLAG ports, forward received VRRP PDUs to all other: vLAG ports, non-vLAG ports and ISL ports; for received VRRP PDUs on non-vLAG ingress ports, forwarding received VRRP PDUs to all other: vLAG ports, non-vLAG ports and ISL ports; and for received VRRP PDUs on ISL ports, forwarding received VRRP PDUs to all other: vLAG ports, non-vLAG ports and ISL ports.

In one embodiment, forwarding packets for process 900 may include: encapsulating the VRRP role by each switch in a formed vLAG in a vLAG synchronizing PDU; sending the vLAG synchronizing PDU to a peer switch though a vLAG ISL; and recording the VRRP role in a local database (e.g., FDB) by each vLAG switch.

In one embodiment, for each VRRP role change for a vLAG switch, process 900 may include the vLAG switch synchronizing a state of the role change with a peer switch.

According to various embodiments, the example flow diagrams 600, 800 and process 900 may be performed by a system, computer, or some other device capable of executing commands, logic, etc., as would be understood by one of skill in the art upon reading the present descriptions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for controllable virtual link aggregation Internet Protocol (IP) forwarding comprising:

forming a first virtual link aggregation (vLAG) between a first pair of switches for a first system that implements virtual router redundancy protocol (VRRP);

forming a second vLAG between a second pair of switches for a second system that implements VRRP, wherein the first system and the second system each comprise a data center system;

forwarding a VRRP role by each switch of the first pair of switches and the second pair of switches to one another;

synchronizing the VRRP role between each of the first pair of switches and the second pair of switches;

determining which VRRP role is a master role for a particular switch between the first pair of switches and the second pair of switches;

providing active controlling for the first pair of switches or the second pair of switches based on the determined master role for the particular switch; and forwarding VRRP packets to particular switch ports of the first pair of switches and the second pair of switches based on a set of rules, the VRRP packets comprising VRRP protocol data units (PDUs), wherein the set of rules for a formed vLAG comprises one or more of:

for received VRRP PDUs on vLAG ports, forwarding received VRRP PDUs to all other: vLAG ports, non-vLAG ports and inter-switch link (ISL) ports;
for received VRRP PDUs on non-vLAG ports, forwarding received VRRP PDUs to all other: vLAG ports, non-vLAG ports and ISL ports; and
for received VRRP PDUs on ISL ports, forwarding received VRRP PDUs to all non-vLAG ports,
wherein in response to a switch one of the first pair of switches and the second pair of switches acting as master, the pair of switches comprising the master switch both perform packet switching functions from external switches.

2. The method of claim 1, wherein for non-formed vLAGs, the set of rules comprise:
for received VRRP PDUs on vLAG ports, forwarding received VRRP PDUs to all other: vLAG ports, non-vLAG ports and ISL ports;
for received VRRP PDUs on non-vLAG ports, forwarding received VRRP PDUs to all other: vLAG ports, non-vLAG ports and ISL ports; and
for received VRRP PDUs on ISL ports, forwarding received VRRP PDUs to all other: vLAG ports, non-vLAG ports and ISL ports.

3. The method of claim 2, wherein forwarding packets comprises:
encapsulating the VRRP role by each switch in a formed vLAG in a vLAG synchronizing PDU;
sending the vLAG synchronizing PDU to a peer switch though a vLAG ISL; and
recording the VRRP role in a local database by each vLAG switch.

4. The method of claim 3, wherein for each VRRP role change for a vLAG switch, the vLAG switch synchronizes a state of the role change with a peer switch.

5. A virtual aggregation link system comprising:
a first pair of switches for a first data center system that implements virtual router redundancy protocol (VRRP), wherein a first virtual link aggregation (vLAG) is formed between the first pair of switches;
a second pair of switches for a second data center system that implements VRRP, wherein a second vLAG is formed between the second pair of switches;
each switch of the first pair of switches and the second pair of switches includes a controllable Internet Protocol (IP) forwarding module, wherein the controllable IP forwarding module:
forwards a VRRP role for each switch of the first pair of switches and the second pair of switches to one another;
synchronizes the VRRP role between each of the first pair of switches and the second pair of switches;
determines which VRRP role is a master role for a particular switch between the first pair of switches and the second pair of switches;
provides active controlling for the first pair of switches or the second pair of switches based on the determined master role for the particular switch; and
forwards VRRP packets to particular switch ports of the first pair of switches and the second pair of switches based on a set of rules, the VRRP packets comprising VRRP protocol data units (PDUs), wherein the set of rules for a formed vLAG comprises one or more of:
for received VRRP PDUs on vLAG ports, forwarding received VRRP PDUs to all other: vLAG ports, non-vLAG ports and inter-switch link (ISL) ports;
for received VRRP PDUs on non-vLAG ports, forwarding received VRRP PDUs to all other: vLAG ports, non-vLAG ports and ISL ports; and
for received VRRP PDUs on ISL ports, forwarding received VRRP PDUs to all non-vLAG ports,
wherein in response to a switch of one of the first pair of switches and the second pair of switches acting as master, each of the pair of switches comprising the master switch perform packet switching functions from external switches.

6. The system of claim 5, wherein for non-formed vLAGs, the set of rules comprise:
for received VRRP PDUs on vLAG ports, the controllable IP forwarding module forwards received VRRP PDUs to all other: vLAG ports, non-vLAG ports and ISL ports;
for received VRRP PDUs on non-vLAG ports, the controllable IP forwarding module forwards received VRRP PDUs to all other: vLAG ports, non-vLAG ports and ISL ports; and
for received VRRP PDUs on ISL ports, the controllable IP forwarding module forwards received VRRP PDUs to all other: vLAG ports, non-vLAG ports and ISL ports.

7. The system of claim 6, wherein the controllable IP forwarding module forwards packets by:
encapsulating the VRRP role for each switch in a formed vLAG in a vLAG synchronizing PDU;
sending the vLAG synchronizing PDU to a peer switch though a vLAG ISL; and
recording the VRRP role in a local database by each vLAG switch.

8. The system of claim 7, wherein for each VRRP role change for a vLAG switch, the vLAG switch synchronizes a state of the role change with a peer switch.

9. A computer program product for virtual link aggregation, the computer program product the computer program product comprising a non-transitory computer readable storage medium having program instructions embodied therewith, the program instructions executable by a processor to perform a method comprising:
forming, by a first pair of switches, a first virtual link aggregation (vLAG) for a first system that implements virtual router redundancy protocol (VRRP);
forming, by a second pair of switches, a second vLAG for a second system that implements VRRP, wherein the first system and the second system each comprise a data center system;
forwarding, by each switch of the first pair of switches and the second pair of switches, a VRRP role to one another;
synchronizing, by the first pair of switches and the second pair of switches, the VRRP role;
determining, by the first pair of switches and the second pair of switches, which VRRP role is a master role for a particular switch between the first pair of switches and the second pair of switches; and
providing active controlling for the first pair of switches or the second pair of switches based on the determined master role for the particular switch; and
forwarding VRRP packets to particular switch ports of the first pair of switches and the second pair of switches based on a set of rules, the VRRP packets comprising VRRP protocol data units (PDUs), wherein the set of rules for a formed vLAG comprises one or more of:
for received VRRP PDUs on vLAG ports, forwarding received VRRP PDUs to all other: vLAG ports, non-vLAG ports and inter-switch link (ISL) ports;

for received VRRP PDUs on non-vLAG ports, forwarding received VRRP PDUs to all other: vLAG ports, non-vLAG ports and ISL ports; and for received VRRP PDUs on ISL ports, forwarding received VRRP PDUs to all non-vLAG ports, wherein in response to a switch one of the first pair of switches and the second pair of switches acting as master, the pair of switches comprising the master switch both perform packet switching functions from external switches.

10. The computer program product of claim 9, wherein for non-formed vLAGs, the set of rules comprise:

for received VRRP PDUs on vLAG ports, the receiving switch forwarding received VRRP PDUs to all other: vLAG ports, non-vLAG ports and ISL ports;

for received VRRP PDUs on non-vLAG ports, the receiving switch forwarding received VRRP PDUs to all other: vLAG ports, non-vLAG ports and ISL ports; and for received VRRP PDUs on ISL ports, the receiving switch forwarding received VRRP PDUs to all other: vLAG ports, non-vLAG ports and ISL ports.

11. The computer program product of claim 10, wherein forwarding packets comprises:

encapsulating the VRRP role by each switch in a formed vLAG in a vLAG synchronizing PDU;

sending the vLAG synchronizing PDU to a peer switch though a vLAG ISL; and recording the VRRP role in a local database by each vLAG switch, wherein for each VRRP role change for a vLAG switch, the vLAG switch synchronizes a state of the role change with a peer switch.

* * * * *